May 16, 1961  H. C. SCHWENK  2,984,127
TRANSMISSION FOR A VALVE OPERATOR
Filed March 14, 1957  2 Sheets-Sheet 1
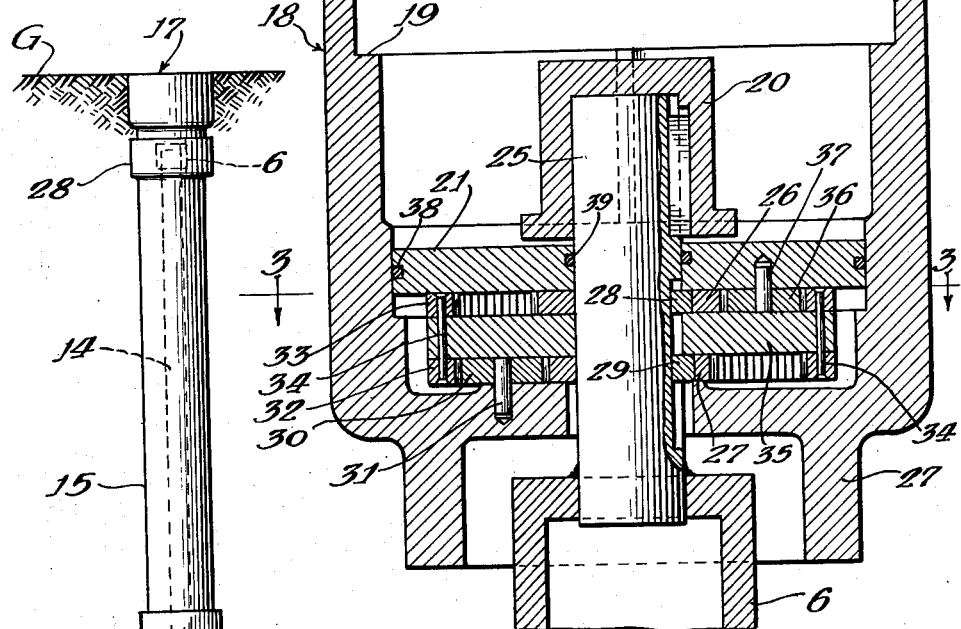
Inventor:
Henry C. Schwenk
By: Schroeder, Hofgren,
Brady & Wegner
Attorneys May 16, 1961  H. C. SCHWENK  2,984,127
TRANSMISSION FOR A VALVE OPERATOR
Filed March 14, 1957  2 Sheets-Sheet 2
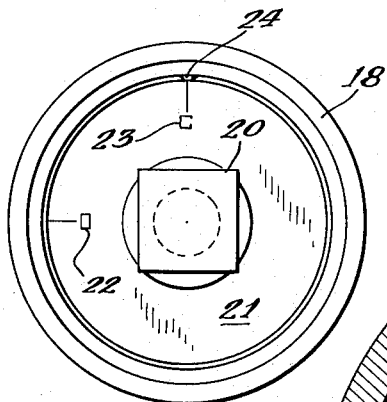
FIG.4
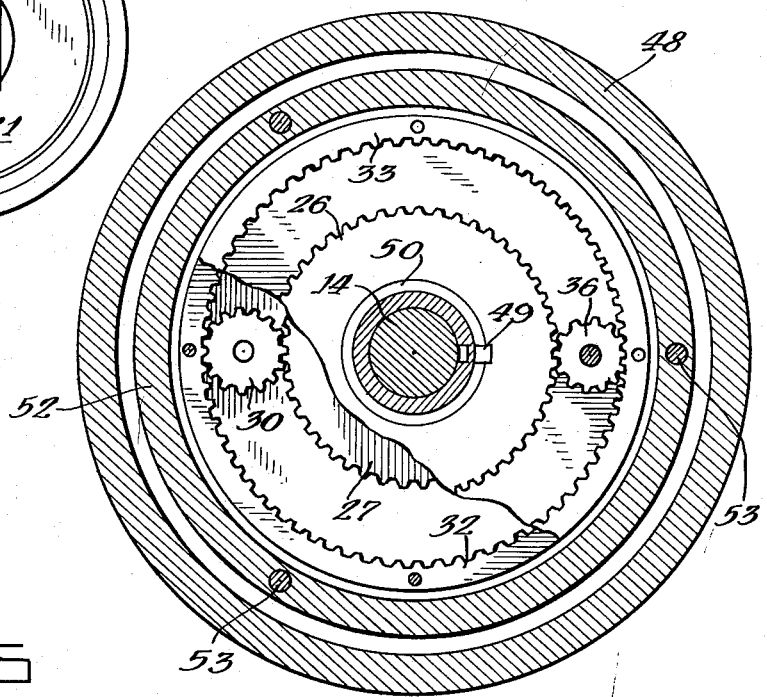
FIG.6
FIG.5
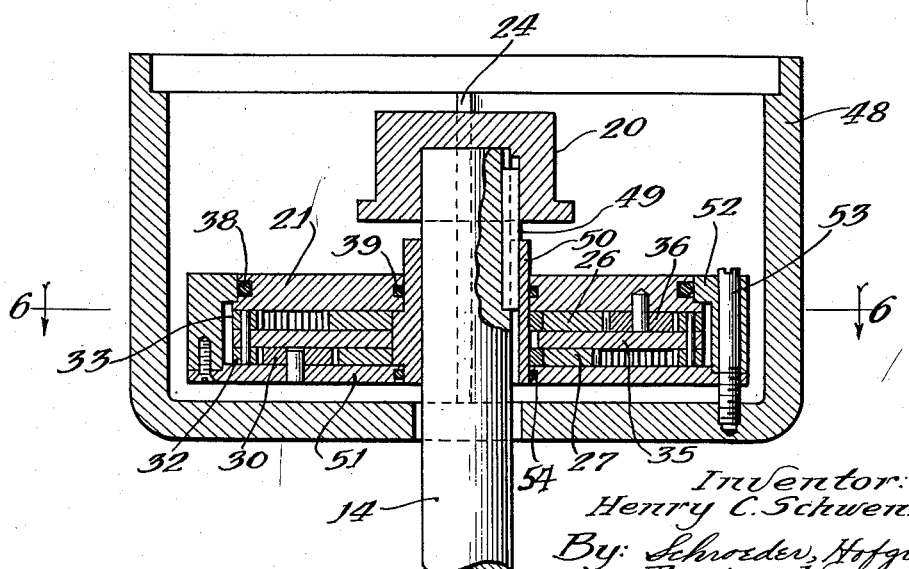
Inventor:
Henry C. Schwenk
By: Schroeder, Hofgren,
Brady & Wegner
Attorneys United States Patent Office 2,984,127
Patented May 16, 1961

2,984,127
TRANSMISSION FOR A VALVE OPERATOR
Henry C. Schwenk, Glenview, Ill., assignor to Henry Pratt Company, a corporation of Illinois
Filed Mar. 14, 1957, Ser. No. 645,943
5 Claims. (Cl. 74—801)

This invention relates to a valve operator and position indicator and more particularly to a transmission unit which may be placed upon the end of an existing valve operating shaft particularly where the valve itself is inaccessible.

In many water works systems there are valves in lines which are inaccessible because of being buried or in other locations out of reach of workmen. Valves in distribution lines are generally below ground and an operating shaft for the valve is carried up to the ground level inside a pipe housing. A cover on the housing may be removed to expose the shaft for the reception of a key by which the shaft may be turned and the valve thusly opened or closed. In the past, workmen have generally made an assumption as to whether a particular inaccessible valve was open or closed. The valve operating shaft was turned manually and the workman was able to "feel" whether or not he had turned the shaft sufficiently to open or close the valve as the case might be. The resistance to turning varied at the extreme positions of the valve in relation to the resistance to turning intermediate the positions. Such procedure resulted in damage to some valves when the assumption arrived at was wrong, but has been generally followed in the absence of a satisfactory operating procedure.

The introduction and more extensive use of butterfly valves in water works systems has complicated the problem since such valves turn quite easily and have very little of the "feel" at the extreme positions of the valve. Workmen accustomed to opening and closing other kinds of valves have caused damage to butterfly valves because of the absence of this "feel" which told them when the valve had reached its desired position.

The primary object of this invention is to provide a new and improved combination valve operator and position indicator.

Another object is to provide an indicator for valve position which may be installed on the accessible portion of a valve operating shaft.

Another object is to provide a valve operator and position indicator which may be mounted in an accessible position so that removal of its cover may expose both the valve operating shaft and an indicator driven therefrom.

A further object is to provide such an indicator for valve positioners which can be turned through less than 360° by a valve operating shaft which may be required to make many turns to move the valve between its extreme positions.

Yet another object is to provide a valve operator and position indicator for use on the end of a valve operating rotary shaft including a movable indicator member about the shaft and a motion transmitting mechanism connecting the shaft and indicator to move the indicator through an arc of less than 360° proportionally to rotation of the operating shaft, the transmitting mechanism including a pair of sun gears of dissimilar size on the shaft and an idler gear in mesh with one of the sun gears, the idler gear being rotatably rotated on the shaft, a planet gear in mesh with the other sun gear, means holding the idler gear shaft stationary, means connecting the planet gear to the indicator, and connecting ring gears in mesh with the idler gear and planet gear to move the indicating member proportional to the central shaft rotation.

Other objects and advantages of the present invention will be understood from the following description of embodiments of the invention illustrated in the accompanying drawings, in which;

Figure 1 is a fragmentary broken elevational view of a buried valve having the invention mounted thereon, Figure 2 is a broken elevational view in section of a preferred form of the combined operator and position indicating device, Figure 3 is a sectional view through the device taken substantially along line 3—3 in Figure 2, Figure 4 is a reduced plan view of the unit with its cover removed, Figure 5 is a view similar to Figure 2 of an alternate form of the invention, Figure 6 is a sectional view through the form shown in Figure 5 taken substantially along line 6—6 in Figure 5.

The problem of indicating the position of a valve which is buried and thus inaccessible may be illustrated with reference to Figure 1. A pipe line 10 below the ground level G has a butterfly type valve 11 mounted therein and having a shaft 12 upon which is mounted a gear box 13 in order to turn the shaft through approximately 90° to open or close the valve. The valve is opened or closed by turning the gears in the gear box. For this purpose, an operating shaft extension 14 extends upwardly from the gear box within an iron pipe housing 15 to a location generally near the ground surface. The upper end of the shaft is provided with a standard square nut 16 for the reception of a socket type of key.

The position indicator and operator 17 of this invention is mounted on top of the pipe housing 15 and connected with the valve operating shaft extension 14. With the use of the present position indicator, a workman does not have to make any assumptions as to the position of the inaccessible valve. Ordinarily, the unit of this invention is provided with a cover which, when removed, will expose the nut upon which the key may be placed and also will expose the position indicator.

The unit itself has a circular housing 18 with an upper ledge 19 for receiving a cover. When the cover is removed, the interior of the unit has an appearance as illustrated in Figure 4. A standard American Water Works square nut 20 for turning the valve is fully exposed for the reception of a key. An indicating disc 21 has marked on there a legend 22 as the letter "O" and a second legend 23 such as the letter "C" which indicate the position of the valve relative to a mark or boss 24 formed on the housing. The disc 21 is caused to move arcuately about the center shaft portion 25 in the unit as the valve is opened or closed. It is preferred that the disc move about 270° even though the shaft may have to turn from 17 turns upwardly to open and close the valve. The number of turns of shaft 14, of course, depends upon the gear ratio employed in the box 13.

The inner end of the shaft portion 25 in the unit is provided with a socket 6 to fit over the square nut 16 on the top of the valve operating shaft 14. The short shaft portion 25 is a part of the unit permitting the unit to be manufactured as such and merely attached to the usual valve shaft extension. A lower flange 27 on the housing is thus provided for fitting into the bell 28 of the pipe housing 15. Other suitable connections may be made to mate with the design of the pipe housing 15 used in a particular installation.

In order that the disc move about the shaft less than one turn for many turns of the shaft itself, a transmission mechanism is mounted about the shaft to affect such movement. In the embodiment of Figures 2 and 3, this mechanism includes an upper sun gear 26 and a lower sun gear 27 both keyed to the shaft 25 by keys 28 and 29. The upper sun gear is slightly larger than the lower and both turn with the shaft 25.

The train of the drive from the lower sun gear is through an intermediate idler gear 30 which is mounted upon a shaft 31 secured in the housing so that the shaft is stationary. An outer ring gear 32 is in mesh with the idler 30 and is pin connected to an upper similar ring gear 33 so that both ring gears move in unison. The pins such as 34 pass through an intermediate spacer 35.

The disc is caused to move by forces supplied to it by a planet gear 36 having a shaft 37 secured to a fixed point on the disc. The planet gear 36 is the final power transfer element of the transmission and receives power by meshing with both the upper ring and upper sun gears. Referring particularly to Figure 3 and assuming a counter-clockwise of the shaft 25, the arrows indicate the direction of movement of each of the gears. It will be apparent that the ring gears move in the opposite direction to the shaft because of the stationary idler 30. Since the ring and sun gears in mesh with the planet 36 move in opposite directions at different speeds, the disc attached to the planet will slowly move bodily about the center shaft. The ratio of the upper sun and planet gears is chosen to obtain about three-quarters of a turn for the disc with a sufficient number of turns of the shaft to open or close the valve.

Since the unit shown in Figures 2 and 3 is intended to be manufactured complete in its housing and merely attached to an existing valve shaft operator, dirt is prevented from entering the mechanism by an O-ring seal 38 at the outer periphery of the disc and engaging the housing and a similar type of seal 39 between the disc and shaft. The gearing is generally of a loose fitting type since such a unit should remain satisfactorily in operation over many decades.

The embodiment of Figures 5 and 6 has a transmission similar to that of Figures 2 and 3. The unit is, however, intended for fitting on the standard valve operator shaft. The housing 48 is not fitted to the transmission, instead, the operator shaft 14 is provided with a key way, and a key 49 connects the shaft to an inner sleeve 50 carrying the upper sun gear 26 and lower sun gear 27. A housing, including a lower plate 51 and a peripheral plate 52 is held stationary by a threaded pin 53 secured to the housing. The lower plate has an O-ring seal 54 against the sleeve 50 and the indicating disc 21 has its inner seal 39 also against the sleeve. Its outer seal 38 rides against the outer portion of the housing 52. In other respects, the transmision is the same as above described as is the operation. Upon removal of the cover, the standard nut 20 and the indicating disc are both exposed to view, a reference point may be placed on the housing for the unit or on the outer housing, whichever is preferred.

The unit of Figures 5 and 6 permits a sealed transmission unit to be made for installation on standard valve operator shafts. Some savings may be affected since the larger housing member need not be machined.

The above described units permit the position indicator to be mounted in the location of the valve operating shaft where a workman will be sure to observe and notice the indicator. The use of the unit insures that valve position is a known factor and no longer subject to conjecture. Damage to valves due to excesive turning of the operating shafts may thus be avoided.

The foregoing detailed description has been given for clearness of understanding only, and no unnecessary limitations should be understood therefrom, for some modifications will be obvious to those skilled in the art.

I claim:

1. An operator and position indicator unit for use with a buried valve having a rotary operating shaft for opening and closing the valve, comprising: a housing adapted to be buried with its top exposed at ground level having a central shaft for attachment to the exposed end of the operating shaft; a key receiving unit on the central shaft permitting manual turning of the operating shaft; a disc idly mounted for turning about the central shaft and a transmission for turning the disc proportionally to shaft rotation, said transmission including a pair of sun gears of unequal size on the central shaft, an idler gear on a shaft secured to the housing in mesh with one of said sun gears, a planet gear on a shaft secured to the disc in mesh with the other sun gear, and ring gears secured together and in mesh with the idler gear and the planet gear to move the disc proportionally to shaft rotation, said transmission connecting the central shaft and disc and providing for a plurality of shaft turns to move the disc less than one turn.

2. An operator and position indicator unit as specified in claim 1 wherein the disc is sealed at its inner periphery against the central shaft and at its outer periphery against the housing enclosing the gears from dirt and the like entering the housing.

3. The valve operator and position indicator of claim 1 in which said transmission is contained within a sealed housing and includes a central sleeve for connection to said central shaft and means are provided for securing said sealed housing to said housing for said central shaft to prevent rotation of said housings relative to each other.

4. A valve operator and position indicator for use on the end of a valve operating rotary shaft extension having a pipe housing, comprising: a housing having a lower portion adapted for connection with the pipe housing; a central shaft portion in the housing having an exposed nut for receiving a key permitting turning of the operating shaft to open and close the valve; an indicator member about the shaft portion movable arcuately relative to the housing; and motion transmitting mechanism connecting the central shaft portion and indicator member to move the member through an arc of less than 360° proportionally to rotation of the operating shaft so that relative position of said member in the housing may visually indicate relative open and closed position of the valve, said mechanism comprising a pair of sun gears of dissimilar size on the central shaft, an idler gear in mesh with one of said sun gears, said idler gear being rotatably supported on a shaft, a planet gear in mesh with the other sun gear, means holding said idler gear shaft stationary, means connecting said planet gear to said indicator member, and connecting ring gears in mesh with said idler gear and said planet gear to move the indicating member proportional to the central shaft rotation.

5. A valve operator and position indicator unit for attachment to the end of a rotary valve operating shaft, comprising: a housing; a shaft in the housing having means for connection to the operating shaft at one end, and an operating key receiving nut at the other end; a position indicting disc arcuately movable about the shaft relative to the housing; and a transmission mechanism connecting the shaft and disc for turning the disc in proportion to shaft rotation and through a position indicating arc less than a full turn about the shaft, said mechanism comprising a pair of sun gears of dissimilar size on the central shaft, an idler gear in mesh with one of said sun gears, said idler gear being rotatably supported on a stationary shaft, a planet gear in mesh with the other sun gear, said planet gear being connected to said disc, and ring gears one above the other respectively in mesh with said idler gear and said planet gear and secured against movement relative to each other so as to move the disc proportional to the central shaft rotation.

References Cited in the file of this patent

UNITED STATES PATENTS

| 1,778,583 | Bryant | Oct. 14, 1930 |
| 2,301,497 | Alspaugh | Nov. 10, 1942 |
| 2,767,681 | Pontius | Oct. 23, 1956 |